Patented May 5, 1953

2,637,675

UNITED STATES PATENT OFFICE 2,637,675

PROCESS FOR PREPARING LAMINATED BODIES OF CELLULOSIC MATERIALS AND PRODUCT

Walter M. Bain, Oak Park, Ill., assignor to The Glidden Company, Cleveland, Ohio, a corporation of Ohio No Drawing. Application March 7, 1952, Serial No. 275,465

18 Claims. (Cl. 154—138)

This invention relates to a process for preparing laminated bodies comprising adhered plies of cellulosic material, one salient feature of the process and of the resulting product being that at least one of said cellulosic plies is a ply of alum-treated paper, and another feature being that the plies are adhered together by the use of an alkaline dispersion of protein and inert solids comprising mineral solids so proportioned as to provide an adhesive which is quick-setting and which penetrates only slightly into the plies. A further feature of the process and of the resulting product is that the amount of such alkali adhesive applied between plies is carefully controlled to the end that the initial acidity of the alum-treated paper is not only capable of neutralizing the entire glue line but is also capable of rendering the glue line acidic throughout, whereby outstanding water-resistance in the glue line of the laminated body can be secured solely by having the proteinaceous adhesive in contact with one or more plies of alum-treated paper.

Accordingly, it is an object of the invention to provide a process for preparing laminated bodies comprising plies of cellulosic material which bodies have therein or are capable of developing therein an acidified protein-inert solids glue line, the acidification of which has resulted solely from the presence of at least one ply of alum-treated paper in contact with said glue line.

A further object is to provide laminated bodies of the type described in the preceding object, which bodies are characterized by excellent water resistance as a result of acidification of said glue line.

These and other related objects will be apparent from the following description of my invention.

This application is a continuation-in-part of application Serial No. 135,816, filed December 29, 1949, and of application Serial No. 27,827, filed May 18, 1948, both now abandoned.

In the modern manufacture of laminated paper board, corrugated paper, paper tubing, paper drums, and like containers, high-speed machinery is generally employed and it is requisite that any adhesive which is employed in connection with such machinery to adhere the various plies together must exhibit quick-setting properties. If quick-set is not obtained, the succeeding manufacturing steps may be seriously impaired, if not wholly prevented. Quick-setting qualities are also desired in adhesives used in the manufacture of plywood. These needs for quick-setting adhesives have long been recognized and various casein and synthetic resin adhesives have been developed to meet such industrial needs. I have now found that this property of quick-set can be imparted to or developed in aqueous alkaline vegetable-seed protein adhesives by formulating the adhesive compositions with a quantity of finely-divided mineral solid matter suitably proportioned to the protein and other solids, and to the water, within limits hereinafter set forth. I have also found that comparable adhesive compositions employing casein alone or mixtures of casein with vegetable protein likewise exhibit quick-setting properties.

Specifically, I have found that when an aqueous alkaline protein adhesive composition is formulated so as to have a total solids content between about 10% and 61%, when part of the total solids content is composed of finely-divided, mineral solid matter in amounts such that the ratio of mineral solids to protein is between about 1 to 10 and 10 to 1, and when the ratio of water to protein is between about 3 to 1 and 19 to 1, then the composition exhibits quick-set. The strength of the adhesive develops so quickly after application that in the case of laminated paper board, it immediately gives fiber tear over the entire surface when one attempts to separate the plies. Other advantages I have found in such protein adhesives are a reduced penetration into the adjacent plies with better retention of the adhesive at the glue line, and an improved water resistance, particularly when alum-treated paper or paper board is glued with my adhesives, as next explained.

In the sizing of paper with rosin, wax or asphalt, it is customary to precipitate the size with alum. Optimum sizing is ordinarily obtained at a precipitation pH of 4.5, and pH values as low as 3.8 are practicable for sizing. At the other extreme, precipitation is complete at pH 6.8, but the sizing is inferior in comparison with precipitation at lower pH values. Consequently sizing is generally effected at definitely acid pH values. Sized papers which have been treated with alum are therefore moderately acidic, and their acidity can be utilized in accordance with my invention to improve the water resistance of the proteinaceous glue line by making the glue line acid and thereby insolubilizing or otherwise reducing the water-sensitivity of the protein content of the glue. This acidification of the glue line by the alum-treated paper is due in part to the fact that my pigmented adhesives do not penetrate the paper appreciably, thereby making less adhesive necessary to produce a strong joint, and in part to the fact that my pigmented adhesives require less protein than would otherwise be necessary, thereby permitting the available acidity of the alum-treated paper to bring the protein of the adhesive to a more uniformly acid pH. Best results are obtained when the adhesive is so formulated and proportioned in respect to the acidity of the paper that the protein in the adhesive is brought substantially into its isoelectric range of pH values 4 to 5. While a pH below 4 gives a water-resistant glue line, this pH is not usually encountered in manufactured papers, as explained above. An acid pH above 5 gives water resistance, but to a lesser degree than the preferred range of 4 to 5. The higher the pH value above 5, in general, the poorer the water resistance.

I herein and in the claims use the terms "protein" and/or "vegetable protein" to refer to the actual protein content of the product which contains same. Thus, casein and an isolated soya protein which contain as much as 98% protein or more (dry basis) are proteinaceous products which I contemplate as "protein" for use in my adhesive. Purified peanut or other vegetable-seed proteins are other contemplated products. Likewise, I contemplate impure casein or impure isolated vegetable-seed proteins such as soya or peanut protein, and I also contemplate use of soya, peanut or other vegetable-seed flours or meals, the latter being either the high-fat or low-fat types. Mixtures of such proteins or proteinaceous products may also be used. Soya flour generally contains 40% to 55% of soya protein. When using such flour, or comparable flours or meals of other vegetable-seed proteins, the actual protein content thereof should be used as the basis for proportioning the mineral solids, as will be explained hereinafter.

The mineral solid matter may be any of the usual inert pigments used in the paint industry, such as titanium dioxide, lithopone, zinc sulfide, blanc fixe, natural barytes, calcium sulfate, etc., but I particularly prefer such cheap inert solids as coating clays, filler clays, talc, mica, slate flour, various earths such as Florida earth, diatomaceous earth, fuller's earth, etc. Chalk or calcium carbonate and other basically-reacting pigments or dispersible solids should preferably be avoided when water resistance in the glue line is sought in accordance with the invention by obtaining complete neutralization and acidification of the glue line. However, such solids can be used so long as the amount thereof is not sufficient to prevent the alum of the alum-treated paper from neutralizing and acidifying the glue line. Colloidal inert clays such as bentonite may be used in small amounts up to about 10% in conjunction with non-colloidal clays to give certain viscosity characteristics. The mineral solids should in all cases be finely ground and should preferably be ground to pigment ranges of particle size so as to permit high dispersion throughout the adhesive composition.

Alkalies should be dissolved in the adhesive composition in amounts sufficient to disperse the protein and to establish an alkaline pH. The alkalinity may be secured by means of any of the usual alkaline agents or salts, such as amonia, triethanolamine, borax, trisodium phosphate, sodium silicates, and oxides, hydroxides or carbonates of alkali metals. Moreover, sodium hydroxide, for example, may be formed in-situ by metathesis from soda ash and lime. Potassium or lithium oxides, hydroxides or carbonates may be used in place of soda ash but for their higher costs. For some purposes, pH values higher than 12 can be used, but when the adhesive is to be used on paper products, a pH above 12 may harm the paper or the sizing of the paper. I therefore generally prefer to keep the pH of the adhesive below 12 for such uses.

Moreover, it will be understood that as little alkali should be used as is consistent with good adhesive strength, since the lower the alkali content is, the more effective the acidity of alum-treated papers becomes in producing water-resistant glue lines.

The following examples illustrate particular embodiments of my invention, but are not restrictive. Unless otherwise stated, all parts or percentages are by weight.

Example 1

An adhesive composition was prepared from a commercial alkali-soluble isolated and refined soya protein, having a total protein content of about 98% on a dry basis, balance ash, and a pipette viscosity of about 42 seconds. The composition was formulated as follows:

| | Parts |
|---|---|
| Isolated soya protein | 100 |
| Paper filler clay | 150 |
| Water | 400 |
| Caustic soda | 4.75 |
| Sodium pentachlorophenate | 3.00 |

These ingredients are preferably combined by adding all of the protein and clay to the water and mixing thoroughly, then introducing the caustic soda, preferably in the form of an aqueous solution. Mixing is then continued for about an hour, more or less, until the alkali has dispersed the protein. Heat may be applied during the mixing to hasten dispersion of the protein, but it is equally satisfactory to prepare the composition without the aid of external heat. The preservative may be added at any time, but is usually added soon after mixing has been started.

The adhesive was applied between two layers of paper carton stock sized with rosin size and alum, the stock being laminated in a continuous roller-type laminating machine through which the stock passed at relatively high speed. In the particular machine involved, a time period of about 15 seconds was allowed for the adhesive to devolpe "set-up." About one gallon of adhesive was applied per 1000 square feet of single glue line. It was found that my adhesive formulated as stated above set up within the allotted time and samples taken from the discharge end of the machine showed that the paper board plies developed fiber tear over the whole surface when an attempt was made to separate the plies. In a test made on hand rolls to simulate the continuous mill operation and to determine therefrom how quickly fiber tear occurred, samples showed that as soon as the plies had passed through the pressure rolls, the adhesive had glued the plies so firmly that fiber tear occurred on separating the plies. Samples of the laminated carton stock made on the continuous machine were tested for water resistance, by immersing samples thereof in water at room temperature for 24 hours. The tests established that delamination had not occurred and that the water resistance of the laminated stock was superior to the then-existing specifications.

Example 2

An adhesive was prepared from commercial soya flour containing about 53% protein by combining 100 parts of the flour with 150 parts of filler clay, 4.5 parts of caustic soda and 375 parts of water. These ingredients were combined in the manner indicated in Example 1. The adhesive was found to develop set-up or "stick" within the allotted time when applied between the rosin and alum-sized plies of paper in the continuous machine described in Example 1. The adhesive also developed fiber tear as soon as the laminated stock had passed through the pressure rolls, and the water resistance of the laminated stock was comparable to the stock made in Example 1 by using isolated protein adhesive.

Example 3

An adhesive was prepared as in Example 1, using isolated soya protein and the following proportions:

|  | Parts |
|---|---|
| Isolated protein (42 second pipette viscosity) | 50 |
| Filler clay | 150 |
| Water | 300 |
| Caustic soda | 2.5 |
| Sodium pentachlorophenate | 1.5 |

A film of the adhesive was applied to one face of a sheet of paper board, and before the film had dried a second sheet of paper board was pressed into contact with the film. Immediately after pressing, the two sheets of paper board were firmly adhered together.

Example 4

An adhesive having quick-setting properties was prepared by mixing 50 parts by weight of isolated soya protein and 100 parts of filler clay into 138 parts of water, then adding with continued mixing 2.5 parts sodium hydroxide dissolved in 25 parts water, and 140 parts of a dispersion of 7 parts bentonite in 133 parts water. After a suitable mixing period to effect the dispersion of the protein, 1.5 parts of sodium pentachlorophenate was added.

Example 5

"Alpha" protein (a commercial grade of alkali-soluble isolated and refined soya protein) was cut with enough caustic soda solution to give a pH of about 10.8, and water and filler clay were incorporated to give 35% solids and a mineral solids/protein ratio of about 1 to 1. This was used in laminating paper board for beer boxes which consisted of 4 plies, and it took 2¾ gallons of the above adhesive per thousand square feet for three glue lines. A gallon of the adhesive weighs about 10 pounds. On testing a cross-section of this laminated board with a Universal pH indicator solution, the pH of the board itself was around 4.5, and the alum had so neutralized the glue line that any difference between its pH and that of the board could scarcely be detected with the indicator. The thickness of the finished board was approximately ⅛ inch. After immersion in water at room temperature for 24 hours, no delamination was found, and fiber tear occurred on separating the plies.

Example 6

An adhesive having quick-setting properties and low penetration into fibre box board was prepared from:

|  | Parts |
|---|---|
| Casein | 140 |
| Paper filler clay | 200 |
| Water | 600 |
| Caustic soda | 7 |
| Sodium pentachlorophenate | 4.8 |

The resulting adhesive had satisfactory viscosity and tack for laminating solid fibre box board, and could be applied in films of sufficient thinness to be acidified by the acidity of the board, yet to give satisfactory adhesive strength in the glue lines.

Example 7

An adhesive having qualities similar to those of the adhesive of Example 6 was prepared from:

|  | Parts |
|---|---|
| Casein | 160 |
| Paper filler clay | 180 |
| Water | 600 |
| Caustic soda | 7.8 |
| Sodium pentachlorophenate | 4.8 |

Small amounts of various preservatives for protein may be added to my aqueous adhesive compositions to permit them to be stored while awaiting use. Suitable preservatives are sodium pentachlorophenate, sodium orthophenylphenate, phenol, and various organomercurials. I have found that when a preservative has been added to my adhesive composition, the composition may be stored for as long as a week without harmful deterioration and without noticeable alteration in its adhesive and working qualities, but the use of a preservative is not essential and may sometimes be omitted when the adhesive is to be used within a short time of its preparation.

I have indicated above that the compositions of my invention should have a dispersed-solids content between about 10% and 61%, and that the ratio of mineral solids to dispersed protein should be between about 1 to 10 and 10 to 1. The solids content of the adhesive may be varied within the limits indicated to give very fluid adhesives or rather viscous adhesives from any type of casein or vegetable-seed protein selected for use. However, there should always be enough water present to effectively disperse the protein; the water-to-protein ratio should not be lower than about 3 to 1, and should preferably be 4 to 1 or higher, up to a ratio of about 19 to 1. With a solids content of less than about 10%, the quick-set qualities are largely lost, even when the ratio of mineral solids to protein is kept within my preferred range of between 1 to 6 and 6 to 1. When the solids content is above about 61%, the resulting adhesive is too viscous for most uses and the viscosity is such that mixing the ingredients together to prepare the adhesive presents some problems. It is best to have heavy-duty mixing equipment available for preparing such high-solids adhesives. For most uses of my adhesives, solids contents between about 20% and 60% are very satisfactory. The ratio of mineral solids to dispersed protein is also critical in respect to the development of quick-set, since I have found by experiment and experience that when the mineral solids to protein ratios are outside of the limits hereindescribed, the adhesive no longer exhibits quick-set. As one progressively adds mineral solid matter and water to a protein dispersion so as to maintain a solids content of about 10%, for example, one observes an increased rate of setting of the adhesive when the ratio of mineral solids to protein is brought to around 1 to 10. As more mineral solids are added up to a ratio of about 1 to 6, progressively faster setting speeds are observed. Ratios between 1 to 6 and 6 to 1 offer variations in other characteristics than setting speed, such as adhesive strength, viscosity, spreadability, tackiness, solids content, flowability, etc., and thereby make it possible to formulate the adhesive to give the various properties desired while yet retaining the outstanding property of quick-set.

In formulating compositions within the limits of solids content, mineral solids to protein ratio and water-to-protein ratio herein set forth, it should be recognized that the isolated protein and/or proteinaceous flour constitutes part of the solids which establish the solids content, and that if protein or a proteinaceous product is added to an already pigmented proteinaceous adhesive to raise the solids content of the latter, a concomitant increase in adhesive strength will result. Accordingly it should be recognized that my adhesive composition can be formulated within the stated limits with various degrees of adhesiveness while yet possessing quick-setting and low penetration characteristics. It will be understood that different gluing problems may require different degrees of adhesiveness combined with quick-setting properties, and that by selecting different qualities or types of casein or vegetable-seed protein and by varying the proportions of protein and mineral solids within the prescribed limits and ratios, the adhesives can be adjusted to one's particular gluing problem or need. Moreover, such selections and adjustments do not sacrifice the cost economies which are possible with my adhesives, since even when one uses a relatively high percentage of protein in a particular formulation, such high percentage permits him also to use correspondingly more mineral solids, thereby increasing the total bulk of the adhesive and decreasing its cost per gallon.

While the solids content, the ratio of mineral solids to soya protein and the ratio of water to protein completely define the proportions found in my adhesives, the following table helps to illustrate the various limitations which should be observed.

table may be necessary to compensate for the non-proteinaceous solids introduced by such sources of protein. However, it should not be understood that only the protein content of the proteinaceous flours imparts adhesiveness to the composition, since the sugars and other components of such flours may contribute some portion of adhesiveness. However, so far as quick-set and low penetration are concerned, it appears that the ratio of dispersed solids to protein and the kind of protein are the principal factors which determine this characteristic.

It will be apparent that the protein and mineral solids may be mixed in suitable proportions in a dry state and either shipped as a packaged adhesive base, or stored until such time as the adhesive is to be made up. In either event, all that is necessary is to mix water with the dry base to the desired solids content and to add sufficient alkali to disperse the protein and establish the proper pH. Alkalies may also be mixed into such a packaged or stored dry base to prepare a completely formulated dry adhesive to which only water need be added.

It will also be apparent that in a plant which operates on a stock protein dispersion and requires quick-set in only a part of its operations, the stock dispersion may be modified in accordance with this invention to impart quick-set to it. In such modification, all that is necessary is to add finely-divided mineral solids to the stock dispersion with proper mixing so as to establish the proper proportions and to adjust the pH, if necessary.

In the foregoing description of the invention, reference has been made to the effect of alum from the alum-treated paper in acidifying, or insolubilizing, the protein of the adhesive thereby to improve the water-resistance of the glue line. It should be understood that under some conditions of application of the adhesive and of laminating various plies together, the alum contained in a ply of alum treated paper which contacts the glue line may have ample opportunity to fully neutralize or even acidify the glue line by the time the laminated product is delivered from the machine and its glue line is tested for pH. In such cases, the glue line can then possess an acid pH substantially through its entire thickness. Under other conditions of application and of laminating practice, the time interval and/or other factors may not permit the alum to act so readily and the glue line of the delivered laminated product, when tested for pH, may not show acid values of pH. In the latter instance, such

| Example | Mineral solids to Protein Ratio | Protein | | Mineral Solids, Parts | Water, Parts | Solids Content, Percent | Water to Protein Ratio | pH |
|---|---|---|---|---|---|---|---|---|
| | | Kind | Parts | | | | | |
| 8 | 10/1 | I. S.[1] | 4.54 | 45.44 | 50 | 50 | 11/1 | 9.9 |
| 9 | 10/1 | Casin | 3.39 | 33.9 | 62.7 | 37.3 | 18.4/1 | 9.9 |
| 10 | 6/1 | I. S. | 7.14 | 42.85 | 50.0 | 50.0 | 7/1 | 10.4 |
| 11 | 6/1 | I. S. | 8.7 | 52.21 | 39.0 | 61.0 | 4.5/1 | 10.2 |
| 12 | 1/1 | I. S. | 12.5 | 12.5 | 75.0 | 25.0 | 6/1 | 10.8 |
| 13 | 1/1 | I. S. | 16.65 | 16.65 | 66.7 | 33.3 | 4/1 | 10.74 |
| 14 | 1/10 | I. S. | 22.72 | 2.27 | 75.0 | 25.0 | 3.3/1 | 10.8 |
| 15 | 1/10 | I. S. | 19.64 | 1.96 | 78.4 | 21.6 | 4/1 | 10.88 |
| 16 | 1/10 | I. S. | 9.09 | 0.91 | 90.0 | 10.0 | 11/1 | |

[1] Isolated soybean.

When soya or other vegetable-seed flour is used to supply the soya protein, or when impure casein or impure isolated soya or vegetable-seed protein is used, some reduction in the quantity or percentage of added mineral solids indicated in the situation is not wholly indicative of the ability of the product to retain its integrity when wet, and the product should be further tested by a test which is commensurate with the ultimate aim of the invention and intended use of the product;

namely, to actually test the water-resistance of the product. Such a test can be easily conducted by simply immersing a sample of the product in distilled water at room temperature for 24 hours and thereafter observing whether the sample (1) has become delaminated and (2) exhibits an acid pH and/or fiber tear when the laminations are separated. A product which becomes delaminated in the course of the test clearly possesses little useful water resistance, but a product which does not become delaminated and at the conclusion of the test exhibits fiber tear on separating the lamination manifestly possesses a degree of water resistance which is highly useful. When the glue line of a product of the latter type is examined for pH at the conclusion of the immersion test, it will be found to be acidic, its acidification having been brought about by the alum of the alum-treated paper therein. It should be noted, however, that acidification of the glue line is not the whole aim of the invention, since the glue line of a product which becomes delaminated when tested in the manner described above can yet have an acid pH; the acidification occurring after delamination. In view thereof, the fundamental aim of the invention can be defined to be the provision of a laminated product (1) in which the alum of a ply of alum-treated paper in contact with the glue line has acted on the glue line sufficiently to prevent delamination when the product is tested in the manner described above, and (2) in which the glue line of the product, at the conclusion of said test, exhibits an acid pH and/or fiber tear when the laminations are separated.

A full appreciation and recognition of the foregoing aims of the invention leads to a modification of the invention which furthers the ultimate aims and permits the advantages of the invention to be secured in certain extreme situations of laminating practice. From what has been said above, it will be understood that under rather extreme conditions such as at very high laminating speeds, or where the solids content of the adhesive is high, the alum in a contacting ply of alum-treated paper may have too little opportunity from the standpoint of time and available moisture to insolubilize the protein sufficiently to provide a laminated product which will not delaminate in the early stage of the 24-hour immersion test. Under such conditions, a small percentage of formaldehyde, paraformaldehyde, acetaldehyde, glyoxal, crotonaldehyde, propionaldehyde, benzaldehyde, hexamethylenetetramine or other aldehydic protein-insolubilizing compounds can be added to the adhesive to effect enough alteration of the protein to prevent delamination prior to the time that the alum has had an opportunity to neutralize and acidify the glue line. Amounts of aldehyde(s) equivalent to about 1–7% of formaldehyde on the protein are usually sufficient for this purpose and yet do not so alter the protein as to prevent the alum of the paper from exerting its beneficial effects of imparting water resistance. The action of aldehydes and of aldehydic protein-insolubilizing compounds on reducing the water sensitivity of proteins is, of course, well known in the art; but it should be recognized that the use of the small amounts contemplated here is but an expedient adopted to prevent the delamination which in some situations may occur before the alum has had sufficient opportunity to accomplish the same effect. So long as delamination can be prevented at the outset when the laminated product contacts water, then the continued or prolonged presence of the water is beneficial in furthering the action of the alum to render the glue line highly water resistant.

It should be recognized that other expedients than the addition of aldehyde(s) can be employed to attain the same result, as for example, by steaming or otherwise moistening the laminations or laminated product during passage through the laminating machine or after discharge of the product therefrom, or by increasing the water content of the adhesive to a higher ratio within the limits set hereinabove, or by aging the laminated product in a moist atmosphere, or by otherwise providing sufficient moisture in and around the glue line of the laminated product to facilitate leaching and diffusion of the alum into the glue line. Such expedients, however, entail additional operations in the manufacture of the laminated product and generally are less desirable from a cost or operating standpoint than the simple expedient of introducing a small amount of aldehyde(s) directly into the liquid adhesive. The latter expedient assures a product which will not become delaminated inadvertently before the alum has had its desired effects. While not desiring to be bound by an expression of theory concerning this result, I believe that the presence of the alum aids the action of the aldehyde(s). At least I have observed that a given percentage of an aldehyde, such as formaldehyde, confers more water resistance in the presence of the alum than is conferred by the same percentage in the absence of the alum.

The present invention has found its greatest usefulness in the manufacture of water-resistant laminated paper board. The adhesives, however, may be employed for the manufacture of plywood and for laminating woven fabrics and other cellulosic material. Also, several different types of materials may be laminated in accordance with the invention, such as paper and wood, paper and fabric, paper and metallic foils such as aluminum, etc. It will also be obvious to those skilled in the art that the two pieces need not necessarily be sheet material in order to take advantage of the desirable properties of the adhesive compositions described or of the acidification feature. For example, alum-treated paper could be adhered to a block of wood without departing from the spirit and scope of the present invention.

It will thus be apparent that my invention may be practiced in a variety of embodiments; and that numerous modifications may be made in its practice by one skilled in the art without departing from the principles set forth above and in the following claims.

In the foregoing description of my invention, wherever I have referred to "mineral solids" or "solids content," the terms have been intended to refer to only the undissolved and colloidally dispersed solids. Dissolved crystalloid alkaline protein dispersing agents and dissolved non-protein components of soya and other proteinaceous flours are not included within these terms. The protein, however, is included within the term "solids content" since I regard the protein as being colloidally dispersed even though it is customary in this art to speak of protein as being "solubilized" when it has been so dispersed. The term "alum-treated paper" is used herein and in the following claims to mean sized paper or paper board which has an acid pH resulting from the presence of alum therein.

Having described my invention, what I claim is:

1. The method of preparing a laminated body comprising at least a pair of adhered cellulosic plies and characterized by its ability to retain its integrity and to exhibit water-resistance at the glue line of said plies when the body is immersed in water, said method comprising the steps of: applying to at least one surface of an alum-treated paper ply an aqueous film of quick-setting proteinaceous adhesive having a total dispersed solids content between 10% and 61% and an alkaline pH, and composed essentially of (a) finely-divided solids, (b) dispersed protein from the class consisting of casein, vegetable-seed protein and mixtures thereof, and (c) water, said finely-divided solids including mineral solids with the latter in a ratio to dispersed protein between about 1 to 10 and 10 to 1, and said adhesive having a ratio of water to protein of between about 3 to 1 and 19 to 1; and firmly contacting said film before it sets with another ply of cellulosic material, said alkaline film of adhesive being applied in sufficient thickness to bond said plies together while yet being sufficiently thin to be acidified to an acid pH substantially throughout its thickness solely by the acidity of the alum-treated paper of said laminated body.

2. The method as claimed in claim 1 wherein the ratio of mineral solids to dispersed protein is between 1 to 6 and 6 to 1, wherein the total solids content is between about 20% and 60%, and wherein the adhesive film is brought to a pH below 5 by the acidity of the alum-treated paper of the laminated body.

3. The method as claimed in claim 2 wherein the protein is isolated soya protein.

4. The method as claimed in claim 2 wherein the protein is soya protein accompanied with the other natural ingredients of soya flour.

5. The method as claimed in claim 1 wherein the protein is soya protein, and wherein the adhesive film is brought to a pH below 5 by the acidity of the alum-treated paper of the laminated body.

6. The method as claimed in claim 1 wherein the protein is casein.

7. The method of preparing a laminated body comprising at least a pair of adhered paper plies and characterized by its ability to retain its integrity and to exhibit improved water resistance at the glue line of said plies when the laminated body is immersed in water, said method compirsing the steps of: applying between a pair of juxtaposed plies of alum-treated sized paper a film of aqueous, alkaline quick-setting proteinaceous adhesive having a total solids content between 10% and 61%, and being composed essentially of (a) finely-divided solids, (b) dispersed protein from the class consisting of casein, vegetable-seed protein and mixtures thereof, and (c) water, said finely-divided solids comprising mineral solids with the latter in a ratio to protein between about 1 to 10 and 10 to 1 and said adhesive having a ratio of water to protein of between about 3 to 1 and 19 to 1; and firmly pressing said juxtaposed plies together before said film of adhesive sets; said alkaline film of adhesive being applied in sufficient thickness to bond said plies together while yet being sufficiently thin to be acidified to an acid pH substantially throughout its thickness solely by the acidity of said pair of sized plies.

8. The method as claimed in claim 7 wherein the ratio of mineral solids to dispersed protein is between 1 to 6 and 6 to 1, wherein the total solids content is between about 20 and 60%, and wherein the film of adhesive is brought to a pH below 5 by the acidity of said plies.

9. The method as claimed in claim 8 wherein the protein is isolated soya protein.

10. The method as claimed in claim 8 wherein the protein is soya protein accompanied with the other natural ingredients of soya flour.

11. The method as claimed in claim 7 wherein the protein is soya protein, and wherein the adhesive film is brought to a pH below 5 by the acidity of said plies.

12. The method as claimed in claim 7 wherein the protein is casein.

13. A laminated cellulosic assembly comprising at least one ply of alum-treated paper adhered to another ply of cellulosic material through a relatively thin layer of proteinaceous adhesive and capable of retaining its laminated integrity when immersed in water and of then, if not sooner, exhibiting an acid pH entirely through said layer of adhesive, said acid pH resulting in-situ in said assembly solely from the acidification by the alum-treated paper of the assembly of a previously intercalated film of an aqueous alkaline, quick-setting, relatively non-penetrating proteinaceous adhesive composed essentially of (1) dispersed protein selected from the class consisting of casein, vegetable-seed protein and mixtures thereof, (2) finely-divided dispersed solids comprising mineral solids, (3) water and (4) a small quantity of alkaline protein-dispersing agent sufficient in amount effectively to disperse said protein and to establish an alkaline pH in said aqueous adhesive, said alkaline adhesive having the named ingredients in the following proportions: (a) a dispersed solids content of between about 10% and 61%; (b) a protein/dispersed mineral solids ratio of between about 1 to 10 and 10 to 1; and (c) a water/protein ratio of between about 3 to 1 and 19 to 1.

14. A laminated assembly as claimed in claim 13 wherein the ratio of protein to mineral solids is between 1 to 6 and 6 to 1 and wherein the total solids content is between about 20 and 60%.

15. A laminated assembly as claimed in claim 14 wherein the protein is soya protein.

16. A laminated assembly as claimed in claim 14 wherein the protein is casein.

17. A laminated assembly as claimed in claim 14 wherein said other ply of cellulosic material is also a ply of alum-treated paper.

18. A laminated assembly as claimed in claim 17 wherein the protein is isolated soya protein.

WALTER M. BAIN.

References Cited in the file of this patent

UNITED STATES PATENTS

| Number | Name | Date |
|---|---|---|
| 695,926 | Hall | Mar. 25, 1902 |
| 1,854,700 | Laucks et al. | Apr. 19, 1932 |
| 1,927,166 | Frieden | Sept. 19, 1933 |
| 2,200,839 | Fleck | May 14, 1940 |
| 2,346,644 | Bauer et al. | Apr. 18, 1944 |
| 2,410,357 | Pattillock | Oct. 29, 1946 |
| 2,549,164 | Bosco | Apr. 17, 1951 |

FOREIGN PATENTS

| Number | Country | Date |
|---|---|---|
| 126,663 | Australia | Jan. 27, 1948 |